United States Patent

[11] 3,593,843

| [72] | Inventor | Alan Harvey Hill<br>Darlington, England |
|---|---|---|
| [21] | Appl. No. | 808,104 |
| [22] | Filed | Mar. 18, 1969 |
| [45] | Patented | July 20, 1971 |
| [73] | Assignee | General Engineering Company (Radcliffe) Limited |
| [32] | Priority | Mar. 21, 1968 |
| [33] | | Great Britain |
| [31] | | 13656/68 |

[54] CONVEYING SCREW
6 Claims, 4 Drawing Figs.

[52] U.S. Cl. .................................................. 198/213, 18/12 SB
[51] Int. Cl. .................................................. B65g 33/30
[50] Field of Search .......................................... 198/213, 214; 18/12 SB

[56]  References Cited
UNITED STATES PATENTS
3,429,435  2/1969  Eckhardt .................... 198/213 X FOREIGN PATENTS
363,149  7/1962  Switzerland ..................
420,581  9/1966  Switzerland ..................

Primary Examiner—Robert G. Sheridan
Attorneys—Harry C. Bierman, Jordan B. Bierman and Bierman & Bierman ABSTRACT: An extruder conveying screw comprising a core having two helical flights thereon, the first of which extends between opposite ends of the screw to define a helical channel and the second of which extends generally across the channel over a portion intermediate the length of the screw, and a casing around said screw characterized in that said second flight is terminated at its upstream end in spaced relationship to the wall of the first flight and further in that the second flight is provided with a groove across its peripheral surface adjacent and parallel to a line of junction between the first and second flights at the downstream end of the latter, said groove having a depth such as to provide a clearance of between 0.060 and 0.090 inches between the base of the groove and the casing.

PATENTED JUL20 1971

3,593,843

INVENTOR:
Alan Harvey Hill,
BY
Bierman & Bierman,
ATTORNEYS.

CONVEYING SCREW

This invention relates to screw conveyors for extrusion or injection machines for plastics or similar materials.

A known form of screw conveyor adapted to be rotated within a cylindrical barrel comprises a central core having two helical flights thereon, the first of which extends between opposite ends of the screw to define a helical channel, and the second of which extends across a said channel to divide same into two chambers. In use, solid plastics material is introduced into the feed channel at one end of the screw conveyor and is progressed down the channel where it is heated and subjected to mechanical shearing to convert the solid material into a viscous or fluid material. The material can only migrate into the discharge chamber of the channel by passing through the fine clearance between the peripheral edge of the second flight and the wall of the bore of the barrel, and this way of positive separation of the solid and viscous or fluid phases of the material is effected, the latter collecting in the discharge chamber of the channel.

Such a known screw conveyor has a number of disadvantages. Thus the included angles between the two flights at their junctions are extremely acute defining dead areas where material will collect and remain to be subject to degradation over a period of time. As we have seen the only way in which material can reach the discharge chamber is by passing over the peripheral surface of the second flight. The maximum clearance permitted if the apparatus is to function effectively is insufficient to allow the passage of small particles of grit and dirt and such therefore become trapped at the downstream end of the feed chamber of the channel at which position they are swept continuously over the wall of the bore of the barrel eventually causing damage to same. Finally as will readily be understood the pressure in the discharge chamber is substantially lower than that in the feed chamber and it follows that when a plastics material including a blowing agent is being processed, the sudden drop in pressure which it experiences in passing over the second flight may cause premature "blowing" of the material.

It is an object of the present invention to provide a screw conveyor which whilst retaining to a substantially extent the advantages of screw conveyors having two chambers as described above overcomes at least to some extent the disadvantages aforesaid.

According to the present invention a conveying screw comprises a core having two helical flights thereon, the first of which extends between opposite ends of the screw to define a helical channel and the second of which extends generally across said channel over an intermediate portion of the length of said screw, characterized in that said second flight is terminated at its upstream end in spaced relationship with respect to the wall of said first flight and in that said second flight is provided with a groove across its peripheral surface adjacent and parallel to a line of junction between said first and second lights at the downstream end of the latter, said groove, having a depth such as to provide a clearance of between 0.060 and 0.090 inch between the base of the groove and the wall of the casing of the machine.

The invention will be further apparent from the following description with reference to the several figures of the accompanying drawings, which show by way of example only one form of conveying screw embodying the invention.

Figure 1:
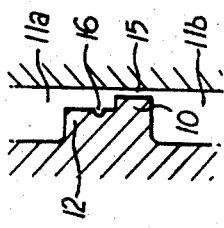
FIG. 1 is a fragmentary view on an enlarged scale of the junction between the two flights of FIG. 4 at point X thereof.
Figure 4:
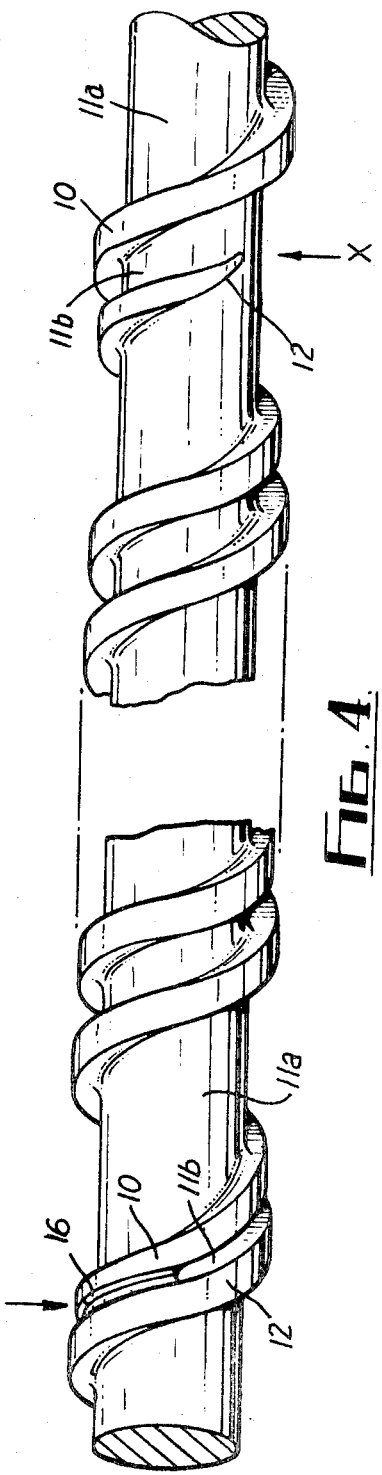
FIG. 4 is a perspective view of a portion of the conveying screw of the present invention.

Thus as can be seen from FIG. 1 the flight 12 is terminated at its upstream end (the end X on FIG. 3) to leave a clearance channel of say one-sixteenth to one-fourth of an inch with respect to the wall of the flight 10, alternatively with a gap of greater than one-fourth of an inch in width the depth of the channel is reduced in that area to say 0.090 inch. This clearance increases the low of material at the input end of the screw and prevents a sudden drop in pressure between the chambers 11a and 11b.

Whilst we have referred to a clearance of about one-sixteenth to one-fourth of an inch in width between the flights 10 and 12 to obviate the production of a sudden drop in pressure, it is possible to provide a clearance greater than one-fourth of an inch in width in which case the depth of the channel is reduced to a minimum intermediate its ends; or alternatively the channel may have an entrance region of greater than one-fourth of an inch in which case there is provided a throat intermediate the ends of the walls of the flights in their junction region. In the first case the channel at its position of minimum depth should be of a depth of 0.060 to 0.090 inch in depth. In the second case the minimum width in the throat region should be of the order of 0.060 to 0.090 inch, but in this case the depth can be somewhat in excess of the width.

Figure 3:
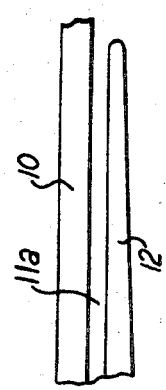
FIG. 3 is a section along line 3—3 of FIG. 2.
Figure 2:
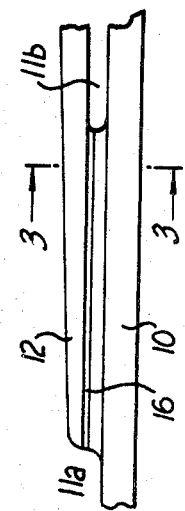
FIG. 2 is a fragmentary view similar to FIG. 1 at point y of FIG. 4.

Referring now to FIGS. 2 and 3 it will be seen that whilst the flight 12 joins the flight 10 at the downstream end (that is at the point Y on FIG. 3) of the former a groove 16 is provided on the peripheral surface of the flight 12 parallel with the wall of the flight 10 along the line of junction therebetween which is itself extended so that the groove 16 is relatively long to restrict the flow of material therethrough. The groove 16 preferably has a depth to provide a clearance in the range of 60 to 90 thousandths of an inch between its base and the wall 15 of the bore of the barrel. The groove 16 may likewise have a width in the range of 60 to 90 thousandths of an inch. Such a groove defines a passage through which particles of grit and dirt normally encountered may pass.

It will be appreciated that it is not intended to limit the invention to the above example only, many variations being possible without departing from the scope thereof.

I claim:

1. An extruder conveying screw comprising a core having two helical flights thereon, the first of which extends between opposite ends of the screw to define a helical channel and the second of which extends generally across said channel over an intermediate portion of the length of said screw, and a casing around said screw characterized in that said second flight is terminated at its upstream end in spaced relationship with respect to the wall of said first flight and in that said second flight is provided with a groove across its peripheral surface adjacent and parallel to a line of junction between said first and second flights at the downstream end of the latter, said groove having a depth such as to provide a clearance of between 0.060 and 0.090 inch between the base of the groove and the casing.

2. A conveying screw as claimed in claim 1 in which there is provided a narrow channel between the first and second flights at the upstream end of the second flight.

3. A conveying screw as claimed in claim 2 in which a narrow channel of between one-sixteenth and one-fourth of an inch is provided between the first and second flights at the upstream end of the second flight.

4. A conveying screw as claimed in claim 2 in which the minimum depth of the narrow channel at the upstream end of the second flight is between 0.060 and 0.090 inch.

5. A conveying screw as claimed in claim 1 in which there is provided a narrow channel between the first and second flights at the upstream end of the second flight, said narrow channel having a throat therein which has a minimum width of between 0.060 and 0.090 inch.

6. A conveying screw as claimed in claim 5 in which the depth of the channel at the throat is somewhat in excess of 0.090 inch.